Nov. 7, 1961 C. J. BARDSLEY 3,007,830
SURFACE TREATMENTS OF SEMICONDUCTIVE BODIES
Filed May 29, 1957
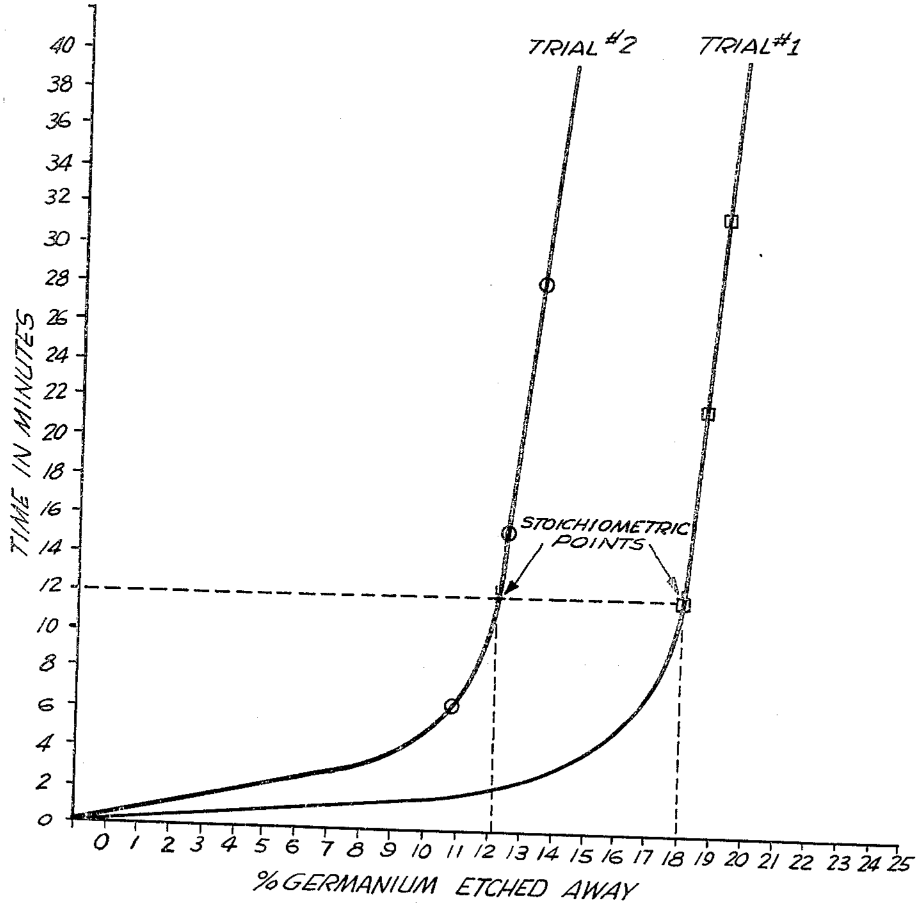
INVENTOR
CHARLES J. BARDSLEY
BY Elmer J. Gorn
ATTORNEY

United States Patent Office 3,007,830

Patented Nov. 7, 1961

3,007,830

SURFACE TREATMENTS OF SEMICONDUCTIVE BODIES

Charles J. Bardsley, Braintree, Mass., assignor to Raytheon Company, a corporation of Delaware Filed May 29, 1957, Ser. No. 662,406
2 Claims. (Cl. 156—17)

This invention relates generally to surface treatments for improving the electrical characteristics of semiconductive bodies, and more particularly to an etching method comprising the application of a specifically proportioned etchant to the semiconductive body in order to control the etching reaction to a point where the length of time during which the semiconductive body is subjected to the etchant is not critical to this realization of useful end products.

In preparing semiconductive bodies for use in electrical translation devices, such as rectifiers, amplifiers, and photosensitive devices, it has been found that the condition of the surface and particularly its smoothness is important in determining the electrical characteristics of the final device. It has further been found that mechanically-prepared semiconductive surfaces alone do not provide an entirely adequate product since mechanical grinding of the surfaces leads to the formation of surface cracks and local distortions which must be removed if acceptable rectification properties are to be achieved. Consequently, some form of chemical attack on the surface is essential in order to provide optimum characteristics. Indications are that such chemical treatments clean off loose debris from the surface, remove lattice distortions, and provide an integral lattice structure of the semiconductive material with which to make electrical contact, the chemical etching producing semiconductive surfaces which have highly ordered lattice structures.

As is now well known in the art, semiconductive bodies, such as germanium or silicon, may be provided with impurity materials which produce either P-type or N-type electrical conductivity characteristics. N-type conductivity occurs when the semiconductive material is made to contain a predominance of an impurity material which donates electrons to the atomic structure of the semiconductive material and gives rise to electrical conduction principally by the flow of electrons. Conversely, P-type conductivity occurs when the semiconductive body contains an impurity material which accepts electrons from the atomic structure of the semiconductive body, thereby creating effective positive current carriers designated as holes.

In the past, chemical etching solutions have been used by means of which a portion of the surface regions of the semiconductive body has been removed at a rate dependent upon the length of time that the semiconductive body has been subjected to the etching solution. In many cases, unless the exposure time was accurately controlled, overetching of the surfaces resulted which impaired the semiconductive bodies for their intended use, and resulted in a large amount of wasted scrap material. In accordance wtih the present inventive concept, an improved etchant and method are provided in which the amount of one or more of the active ingredients is predetermined in relation to the amount of semiconductive material which it is desired to remove from the surface of the semiconductive body. This eliminates the necessity of accurately controlling the time during which the chips are exposed to the solution, since after the desired predetermined amount of material has been removed from the chips, the etching reaction substantially ceases, thereby obviating the danger of overetching present with heretofore utilized etching solutions. In addition to the exposure time advantages attained, it has been found that the final surface appearance and mechanical strength of the etched chip are also improved.

The invention will be better understood as the following description proceeds taken in conjunction with the single figure of the accompanying drawing depicting a graph showing the percentage of semiconductive material desired to be etched away plotted versus the exposure time in minutes, and indicating the stoichiometric points at which etching action substantially ceases.

An etching solution in accordance with the present invention may be provided which includes an oxidizing agent and a complexing agent, and in which the oxidizing agent and/or the complexing agent is present in a precalculated amount designed to remove a predetermined amount of semiconductive material from a semiconductive body during a given immersion time. The etching solution is prepared by stoichiometrically limiting either the concentration of the oxidizing agent or the concentration of the complexing agent in the total solution. In one embodiment of the present invention, the solution may, for example, contain nitric acid as the oxidizing agent, hydrofluoric acid as the complexing agent, and glacial acetic acid as the diluent. The stoichiometric quality is incorporated into the etching solution by limiting the amount of the hydrofluoric acid in the formula to a calculated amount, and using a measured amount of etching solution to etch away a definite amount of semiconductive material, such as germanium or silicon. This depends upon the action between the semiconductive material and the nitric and hydrofluoric acids (the active ingredients) present. The mechanism of the reaction in the case of germanium involves oxidation by the nitric acid and complexing of the germanium ion by the hydrofluoric acid. Since the amount of the limited acid is known, the amount of germanium and hence the amount of thickness to be removed from the chips may be calculated. In the particular embodiment herein disclosed, the hydrofluoric acid is limited for greater economy and safety in handling of the etching solution. The amount of etch used varies with the amount of germanium to be removed, size of chip, and the number of the chips. For example, it has been found that an etching solution composed of 10 milliliters of nitric acid, concentrated AR grade, 8 milliliters of hydrofluoric acid (48–51%), AR grade, and 79 milliliters of acetic acid, glacial AR grade, will dissolve about .034 gram of germanium per milliliter depending upon the strength of the hydrofluoric acid. Utilization of this volume of solution will stoichiometrically etch 3 mils from each of 692 germanium chips, provided sufficient agitation is applied, each chip being 86 mils in length, 125 mils in width and 12 mils in thickness. As can be seen by referring to the drawing, the percentage of germanium removed by the etching action proceeds until the precalculated desired amount is removed, whereupon the reaction substantially ceases, or at least the reaction rate slows down to a level which, in effect, stops the etching.

In the preparation of semiconductive chips for use in circuit devices, slabs may first be cut from ingots of the semiconductive material and then sliced and diced into chips suitable for this use. The chips may then be subjected to mechanical polishing methods such as a sandblasting technique to provide a clean surface on which a good contact can be made. The surface which is to be subjected to the etching treatment is improved by the abrading step in that a rapid and even attack by the chemical reagent is insured. The abraded surface is then subjected to the etching operation. This may be accomplished by placing the chips into an etching solution, in a polyethylene container which is agitated, as set forth above, and allowing the reaction to go to completion whereupon the chips may be removed and rinsed or washed with a noncontaminating cleanser, as, for example, isopropanol and then dried with heat. The chips are then ready to be alloyed with the conductivity-type impurities in order to manufacture the completed semiconductive device.

Although there has been described what is considered to be a preferred embodiment of the present invention, various adaptations and modifications thereof may be made without departing from the spirit and scope of the present invention as defined in the appended claims.

What is claimed is:

1. The method of improving the electrical characteristics of a semiconductive body selected from the group consisting of germanium and silicon, said method comprising combining approximately 10 milliliters of nitric acid, concentrated AR grade, approximately 8 milliliters of hydrofluoric acid (48–51%), AR grade, and approximately 79 milliliters of acetic acid, glacial AR grade, into a solution in which the amount of said hydrofluoric acid is thereby limited to an amount effective to render said solution capable of removing substantially only a predetermined portion of material from the total mass of said body irrespective of the time period to which said body may be subjected to said solution, subjecting said body having a total mass greater than said predetermined portion to said solution, allowing etching reaction between said solution and said body to freely occur without regard to timing until said reaction is substantially exhausted due to the removal of substantially said predetermined portion of material from said body, and washing said solution from said body.

2. The method of improving the electrical characteristics of germanium, said method comprising combining approximately 10 milliliters of nitric acid, concentrated AR grade, approximately 8 milliliters of concentrated hydrofluoric acid (48–51%), AR grade, and approximately 79 milliliters of glacial acetic acid, AR grade, into a solution which is thereby capable of dissolving substantially only a predetermined .034 ratio of grams of germanium per milliliter irrespective of the time period during which germanium may be subjected to said solution, subjecting a quantity of said solution to a quantity of germanium material with the total mass of said germanium material being greater than said predetermined ratio in proportion to the quantity of solution to which said germanium material is subjected, allowing etching reaction between said quantity of solution and said germanium material to freely occur without regard to timing until said reaction is substantially exhausted due to the removal of germanium in accordance with said predetermined ratio, and washing said solution from said body.

References Cited in the file of this patent

UNITED STATES PATENTS

| | | |
|---|---|---|
| 2,619,414 | Heidenreich | Nov. 25, 1952 |
| 2,711,364 | Beach | June 21, 1955 |
| 2,736,639 | Ellis | Feb. 28, 1956 |
| 2,739,882 | Ellis | Mar. 27, 1956 |
| 2,849,296 | Certa | Aug. 26, 1958 |

FOREIGN PATENTS

| | | |
|---|---|---|
| 503,304 | Canada | May 25, 1954 |